United States Patent
Quintavalla et al.

(10) Patent No.: US 6,314,655 B1
(45) Date of Patent: Nov. 13, 2001

(54) AUTOMATIC BALL SIZING DEVICE

(75) Inventors: Steven J. Quintavalla, Bedminster; Henry Thumm-Borst, Norristown, both of NJ (US)

(73) Assignee: United States Golf Association, Far Hills, NJ (US)

( * ) Notice: Subject to any disclaimer, the term of this patent is extended or adjusted under 35 U.S.C. 154(b) by 0 days.

(21) Appl. No.: 09/453,198

(22) Filed: Dec. 2, 1999

(51) Int. Cl.$^7$ .................................................. G01B 5/08
(52) U.S. Cl. .............................. 33/555.1; 33/712; 33/549
(58) Field of Search ........................... 33/555.1, 1 BB, 33/712, 501.02, 501.04, 548, 549, 550, 555.3

(56) References Cited

U.S. PATENT DOCUMENTS

| | | | |
|---|---|---|---|
| 1,196,789 | * | 9/1916 | Koelpin ................................ 33/555.3 |
| 3,391,465 | * | 7/1968 | Eidam .................................. 33/555.3 |
| 4,240,206 | * | 12/1980 | Baresh et al. ........................ 33/555.1 |
| 4,596,076 | * | 6/1986 | Sigg .................................... 33/555.1 |
| 4,977,682 | * | 12/1990 | Allen, III .............................. 33/550 |
| 5,107,853 | * | 4/1992 | Plyter .................................... 33/512 |
| 5,351,410 | * | 10/1994 | Hainneville .......................... 33/555.1 |

* cited by examiner

*Primary Examiner*—Christopher W. Fulton
(74) *Attorney, Agent, or Firm*—Francis C. Hand; Carella, Byrne, Bain, Gilfillan, Cecchi etal.

(57) ABSTRACT

The ball sizing device has an angularly disposed support which defines a square-shaped space for receiving a dimpled golf ball. The two lowermost walls defining the space receive the ball in point-to-point contact. Each of the two opposite walls has a gauge mounted thereon with a spring loaded pin for engaging the ball in point-to-point contact. Each gauge serves to measure a deviation of the diameter of a ball from a standard diameter. The readings from the gauges are processed in a central processing unit in order to obtain a statistical average of the diameter of the ball. A standardizing cylinder is separately mounted on the sizing device in order to calibrate the two gauges to a zero reading and to provide a standard diameter value to the central processing unit.

11 Claims, 1 Drawing Sheet

AUTOMATIC BALL SIZING DEVICE

Figure 1:
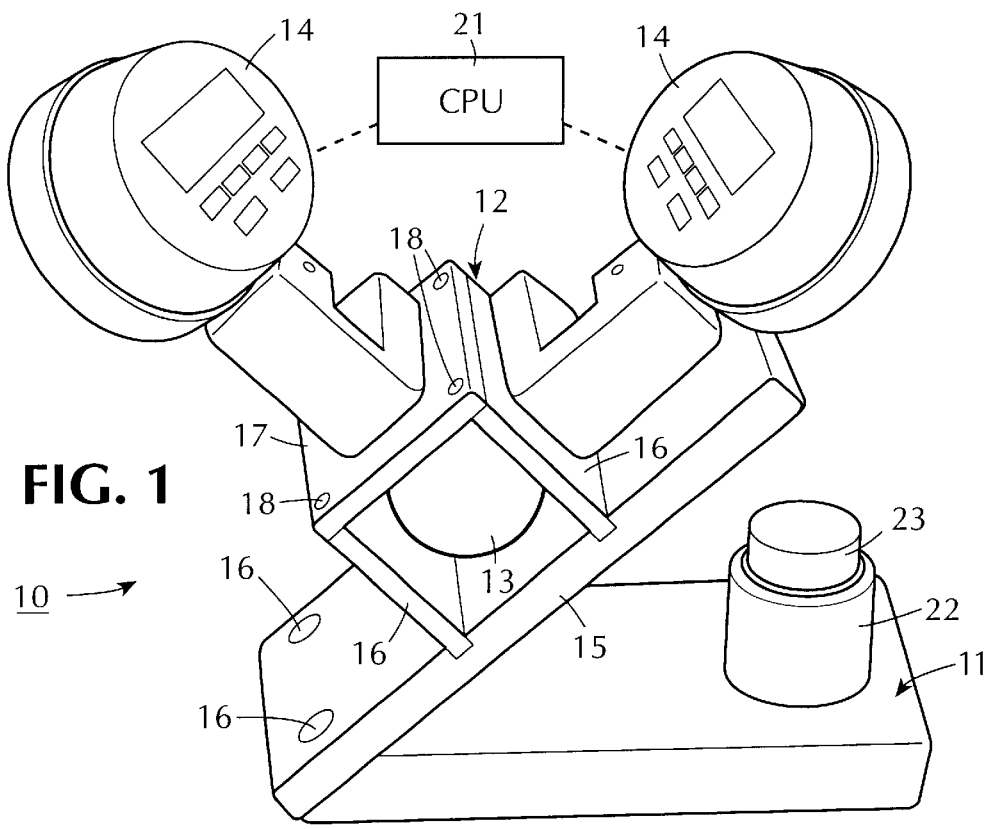

This invention relates to an automatic ball sizing device. More particularly, this invention relates to an automatic ball sizing device for measuring the diameter of a golf ball.

Heretofore, various types of devices have been known for measuring the diameter of a ball. In may cases, multiple measurements are taken of the diameter of the ball at different points on the surface of the ball and an average value is taken as the diameter of the ball.

In order to compensate for the dimples in measuring the diameter of a golf ball, it has been known to place the golf ball in a cup and to then position a sensor against the exposed surface of the ball in order to obtain a reading of the diameter of the ball. Since golf balls are not typically produced in a way consistent with perfect sphericity, the sensor is then removed, the ball rotated to a new position and the sensor then repositioned to obtain a second reading. These steps are repeated to obtain a series of readings which are then averaged to obtain a measurement of the ball diameter. However, such a technique is time-consuming and burdensome.

Accordingly, it is an object of the invention to provide a relatively simple technique for accurately determining the diameter of a dimpled golf ball.

It is another object of the invention to provide a simple device for automatically obtaining the size of a golf ball.

Briefly, the invention provides an automatic ball sizing device which is comprised of a support defining a space for receiving a ball and a pair of gauges mounted on the support. The support is formed with four walls with a pair of the walls being disposed perpendicularly of each other to receive a ball thereon in point-to-point contact. In this way, two points of contact are established between the surface of the ball and the support.

Each gauge is mounted on a respective wall of the other pair of walls of the support for contacting a ball in point-to-point contact. Thus, the distance between the point of contact of the gauge with the ball and the point of contact of the surface of the ball with the opposite support wall establishes a measurement of the diameter of the ball. Each gauge is constructed to emit a signal representative of a measured deviation of the diameter of the ball from a predetermined diameter. Each gauge is also provided with a read out such as a digital display for displaying the plus or minus deviations from a zero reading. In this respect, a viewer can readily determine to what degrees the diameter of the ball being measured is greater or less than the standard diameter.

The information provided by the digital displays of the gauges may then be used to determine the diameter in accordance with the formula:

$$D = (\text{predetermined diameter}) + (D1+D2)/2$$

Wherein D1 is the value of the signal received from one gauge.

D2 is the value of the signal received from the second gauge.

D is the calculated diameter, and the predetermined diameter is the standard diameter of the ball being measured.

In effect, for each measurement, the two gauges obtain two diameter deviation values for a given ball. These values are then incorporated into the above formula so that a diameter of the ball can be mathematically calculated.

A central processing unit may also be connected to the gauges in order to perform the calculation; however, the use of a central processing unit is not necessary.

A standardizing means, for example, in the form of a cylinder is also provided with the sizing device to establish a standard diameter for a ball and to calibrate each gauge to a zero position prior to sizing a ball. In this respect, the cylinder which is made of metal for long-lasting use is formed with a precise outside diameter. When used for calibrating the sizing device, the cylinder is slid into the ball-receiving space of the support so that the readings on the digital displays of the two gauges may each be set to zero in order to calibrate the gauges. Once the gauges have been calibrated, the cylinder is removed and a golf ball is inserted into the recess of the support so that any deviations of the diameter of the ball from the standard diameter are sensed and measured by the two gauges.

When the sizing device is being calibrated, signals are emitted from the gauges to the central processing unit so that the central processing unit is able to record the diameter of the standardizing cylinder. Subsequent signals which are received from the gauges during a ball sizing operation are thus a measure of the deviations of the diameter of the ball from the standardized diameter.

After a first pair of measurements is obtained, the ball may be rotated into another position to obtain subsequent pairs of measurements. For example, twelve pairs of measurements may be taken for one ball. The central processing unit is then able to calculate a statistical average of all of these measurements to obtain an accurate reading of the diameter.

Each gauge is spring loaded in that a sensing pin or the like is spring biased out of the gauge into the ball-receiving space of the support. In addition, the support is hollow from one end to the other so that a ball may be pushed through the space from one end of the support to the other end. For example, when sizing a ball, the ball is first pressed manually into the space against the bias of the spring loaded pins of the gauges. As the ball is passed through, the maximum values returned by the two gauges are recorded by the central processing unit which, in turn, calculates the corresponding diameter of the ball. Thus, the diameter of a ball may be measured in a relatively simple, fast and accurate manner in one pass through the support. There is no need to pull a ball out of the support as with previous sizing devices since the ball is easily pushed through the support. Also, there are no sensors to reposition and/or reset.

Once the cylinder is placed in the sizing device, the gauges are calibrated, for example, to a zero reading. Subsequent readings on the gauges for a ball then provide a measure of the deviation of the ball from the standard diameter. In effect, the central processing unit calculates the deviation of the ball from the standard diameter in order to obtain an output of the actual diameter of the ball.

Figure 2:
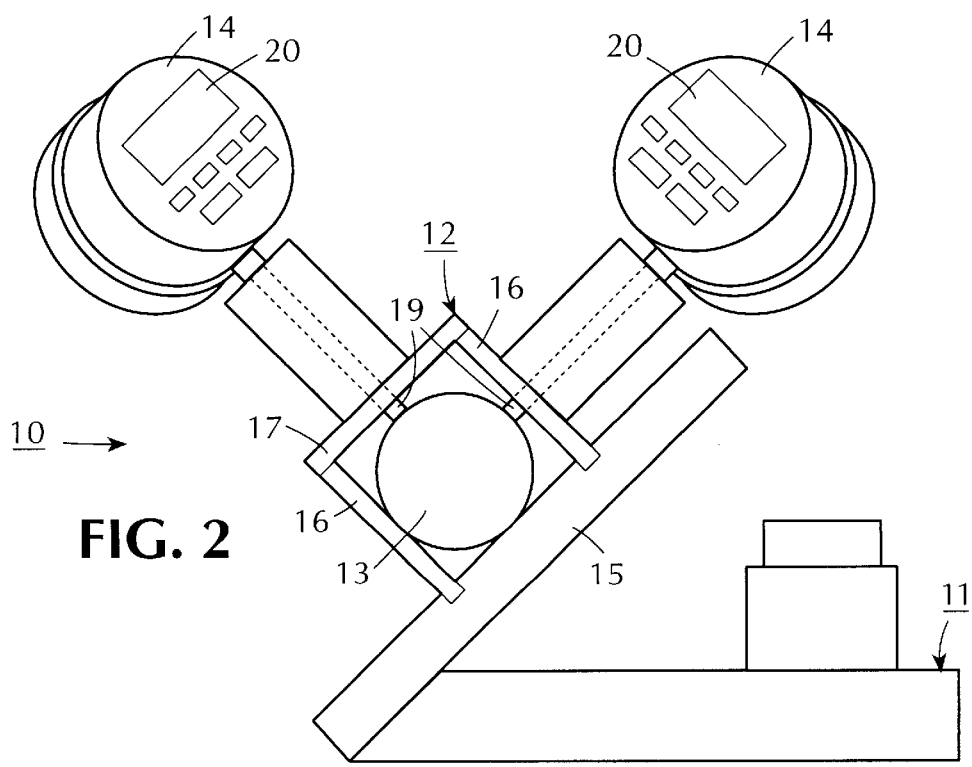

These and other objects and advantages of the invention will become more apparent from the following detailed description taken in conjunction with the accompanying drawings wherein:

FIG. 1 illustrates a perspective view of an automatic ball sizing device in accordance with the invention; and FIG. 2 illustrates a front view of the support for receiving a ball and a pair of gauges mounted on the support in accordance with the invention.

Referring to FIG. 1, the automatic ball sizing device 10 is constructed as a readily portable table-top unit including a base 11, a support 12 for receiving a ball 13 and a pair of gauges 14.

The base 11 is made of any suitable material and shape. As illustrated, the base 11 is formed of a flat metal rectangular block so as to be readily mounted horizontally on a flat table top surface for use.

The support 12 includes a metal rectangular plate 15 which is mounted on the base 11 in an angularly disposed manner for example at a 45° angle and secured to the base 11 by a pair of bolts 16 or the like. The support 15 is formed with four walls which are perpendicularly disposed relative to each other in order to define a square-shaped space for receiving the ball 13. As illustrated, the four walls 16 are defined by an integral portion of the support plate 15, a pair of perpendicularly disposed plates 16 fitting into slots in the plate 15 and a plate 17 which is secured to the perpendicularly disposed plates 16 by bolts 18 or the like. In this respect, the support may be cast of metal in one piece so as to define three of the four walls with the fourth wall being subsequently bolted in place.

Referring to FIG. 2, the four walls 15, 16, 17 of the support 12 are disposed so that the two lowermost walls are disposed perpendicularly to each other to receive the ball 13 thereon in point-to-point contact with each defining an angle of 45° relative to a vertical plane passing through an apex defined by the two lowermost walls. The space between the four walls is sized so as to receive the ball 13 therein with a slight spacing of the ball from the two uppermost walls of the support 12.

Each gauge 14 is mounted on an uppermost wall and has a sensing pin 19 or the like which is spring biased out of the gauge 14 in a direction into the ball-receiving space of the support 12 to contact the ball 13 in point-to-point relation. Each gauge 14 is also provided with a digital display 20 to display a digital value of the deviation of a pin 19 from a zero point of reference. Each gauge 14 also communicates with a central processing unit 21 so as to deliver a signal thereto representative of a measured deviation of the diameter of the ball 13 from a predetermined diameter.

The pin 19 of each gauge 14 is cylindrical and of a diameter which is greater than the typical diameter of a dimple in a golf ball 13. Hence, a flat surface at the end of the pin 19 is able to make a point-to-point contact with the surface of the ball 13. In this respect, it is to be understood that the dimple is considered to be recessed radially within the surface of a golf ball. Thus, all measurement points which are taken are on the surface of the ball and not within a dimple.

A receptacle 22 is mounted on the base 11 to receive a standardizing means 23, for example, in the form of a cylinder or tube of metal having a precise outside diameter. This standardizing means 23 is used to calibrate the gauges 14 prior to taking a measurement of a ball 13. For example, the cylinder 23 is removed from the receptacle 22 manually and slipped into the space defined by the four walls of the support 12. At this time, the cylinder 23 contacts the two lowermost walls 16 in point-to-point contact and pushes the spring biased pin 19 of each gauge 14 in a direction into the respective gauge 14. Each gauge 14 is provided with suitable controls (not shown) which permits the gauge 14 to be zeroed out with the cylinder 23 in place. That is to say, each gauge 14 may be adjusted so that a zero reading is obtained on a digital display 20. Corresponding signals are also delivered to the central processing unit 21 to establish a datum point for each gauge 14 corresponding to the diameter of the cylinder 23.

Thereafter, the cylinder 23 is removed and placed back into the receptacle 22. A ball 13 can then be inserted between the four walls of the support 12, for example, from the front of the sizing device 10. At this time, the ball 13 rests in point-to-point contact with the two lowermost walls and biases the two pins 19 of the gauges 14 outwardly. Each gauge 14 then provides a reading of the deviation of the pins 19 from the zero datum not only on the readout 20 but also electronically in the central processing unit 21.

While each gauge 14 provides a measurement of the deviation of a diameter measurement of the ball 13 from the standardizing cylinder 23, the central processing unit 21 is programmed to produce a diameter reading from each pair of deviation signals.

Each time that the ball 13 is positioned in the support 12, a pair of readings is obtained of the diameter of the ball 13. After obtaining a first pair of readings, the ball 13 may be manually rotated within the support 12 to obtain a second pair of readings. It has been found that twelve pairs of measurements may be taken for one ball in a relative short time by simply digitally rotating the ball into random positions using a thumb and one finger.

The central processing unit 21 is then programmed to calculate a statistical average of all of these readings in order to obtain an accurate reading of the diameter of the ball 13. The sizing device 10 is thus able to obtain a statistically accurate measurement of the diameter of a dimpled ball 13 since any deviations of the contact point of a pin 19 of a gauge 14 with the surface of the ball 13 are averaged out.

After the ball 13 has been manipulated and the readings taken, the ball 13 is manually pushed to and through the rear of the space defined by the walls of the support 12 and another ball placed into the support for measurement purposes.

The invention thus provides a ball sizing device of relatively simple construction which can be readily used in a simple manner. As described above, the user need only push a ball into the support from one end to obtain a first pair of readings and then need only rotate the ball, for example using the thumb and one finger, to rotate the ball while in place in order to obtain further pairs of readings.

The invention also provides a sizing device which may be calibrated in a simple accurate manner from time to time after several balls have been measured. A simple standardizing device, such as a metal cylinder, can be used for this purpose without need for sophisticated instrumentation.

What is claimed is:

1. An automatic ball sizing device comprising
   a support having four walls defining a space for receiving a ball, a first pair of said walls being disposed perpendicularly of each other to receive a ball thereon in point-to-point contact; and
   a pair of gauges, each gauge being mounted on a respective wall of a second pair of said walls for contacting a ball in said space defined by said four walls in point-to-point contact and emitting a signal representative of a measured deviation of the diameter of the ball from a predetermined diameter.

2. A device as set forth in claim 1 further comprising a standardizing means for placement in said space in contact with said bottom pair of walls and said gauges, said standardizing means having the predetermined diameter for establishing a standard diameter for a ball.

3. A device as set forth in claim 2 wherein said standardizing means is a cylinder.

4. A device as set forth in claim 1 further comprising a central processing unit for receiving said signal from each gauge and for calculating a diameter of a ball in said ball-receiving space of said support in dependence on the formula:

$$D = (\text{predetermined diameter}) + (D1 + D2)/2$$

wherein:

D1 is the value of the signal received from one gauge,

D2 is the value of the signal received from the second gauge, and

D is the calculated diameter.

5. A device as set forth in claim 1 wherein said first pair of walls are disposed angularly of a vertical plane passing therebetween.

6. A device a set forth in claim 5 wherein said support includes a horizontally disposed base plate and an angularly disposed plate secured to and extending from said base plate at a 45° angle, said angularly disposed plate defining one of said first pair of walls.

7. An automatic ball sizing device comprising a base plate;

an angularly disposed plate mounted on and extending from said base plate;

three perpendicularly disposed walls defining a square-shaped space with said angularly disposed plate for receiving a ball;

a first gauge mounted on one of said walls for contacting a ball in said space and emitting a first signal representative of a measured deviation of the diameter of the ball from a predetermined diameter thereat; and a second gauge mounted on an adjacent one of said walls for contacting a ball in said space and emitting a second signal representative of a measured deviation of the diameter of the ball from a predetermined diameter thereat.

8. A device as set forth in claim 7 further comprising a central processing unit for receiving said signal from each gauge and for calculating a diameter of a ball in said space of said support in dependence on the formula:

$$D=(\text{predetermined diameter})+(D1+D2)/2$$

wherein:

D1 is the value of the signal received from one gauge,

D2 is the value of the signal received from the second gauge, and

D is the calculated diameter.

9. A device as set forth in claim 8 wherein each gauge has a spring biased pin for contacting a ball in said space and emitting a signal to said central processing unit corresponding to a deviation of the diameter of the ball from the predetermined diameter.

10. A device as set forth in claim 9 wherein each gauge has a display for displaying a digital value of said deviation signal.

11. A device as set forth in claim 9 further comprising a cylinder for placement in said space in contact with said plate and one of said walls and in contact with said pin of each gauge, said cylinder having the predetermined diameter for establishing a standard for a ball.

\* \* \* \* \*